(12) United States Patent
Bacher et al.

(10) Patent No.: US 7,530,463 B2
(45) Date of Patent: May 12, 2009

(54) BACKWASHABLE FILTERING DEVICE

(75) Inventors: Helmut Bacher, St. Florian (AT);
Helmuth Schulz, Linz (AT); Georg Wendelin, Linz (AT)

(73) Assignee: Erema Engineering Recycling Maschinen und Anlagen Gesellschaft m.b.H., Freindorf (AT)

( * ) Notice: Subject to any disclaimer, the term of this patent is extended or adjusted under 35 U.S.C. 154(b) by 442 days.

(21) Appl. No.: 10/544,236

(22) PCT Filed: Dec. 9, 2004

(86) PCT No.: PCT/AT2004/000433

§ 371 (c)(1),
(2), (4) Date: Aug. 2, 2005

(87) PCT Pub. No.: WO2005/072932

PCT Pub. Date: Aug. 11, 2005

(65) Prior Publication Data

US 2006/0157402 A1     Jul. 20, 2006

(30) Foreign Application Priority Data

Jan. 28, 2004   (AT) ................................ A 115/2004

(51) Int. Cl.
*B01D 29/01*     (2006.01)
*B01D 35/00*     (2006.01)
*B01D 29/88*     (2006.01)

(52) U.S. Cl. .................. 210/427; 210/108; 210/333.01; 210/333.1; 210/393; 425/197; 425/198

(58) Field of Classification Search ............ 210/333.01, 210/333.1, 108, 393, 411, 427
See application file for complete search history.

(56) References Cited

U.S. PATENT DOCUMENTS

| | | | |
|---|---|---|---|
| 5,308,484 A | | 5/1994 | Bacher et al. |
| 5,779,898 A | * | 7/1998 | Schwanekamp et al. .... 210/324 |

* cited by examiner

*Primary Examiner*—Krishnan S Menon
*Assistant Examiner*—Benjamin Kurtz
(74) *Attorney, Agent, or Firm*—Townsend and Townsend and Crew, LLP

(57) ABSTRACT

A backwashable filtering device for thermoplastic plastics material is disclosed. The device can filter thermoplastic plastics material through one or more nests of screens in the filtering position, while submitting some nests of screens to the backwashing process that cleans them. The filtering position and the backwashing position are selectable by displacing one or more carrying bodies with respect to a housing and/or by displacing one or more control bodies with respect to the carrying bodies. The backwashing can be performed over an entire nest of screens or over a portion of a nest of screens. The nests of screens can be straight or curved.

8 Claims, 6 Drawing Sheets

BACKWASHABLE FILTERING DEVICE

BACKGROUND OF THE INVENTION

Figure 1:
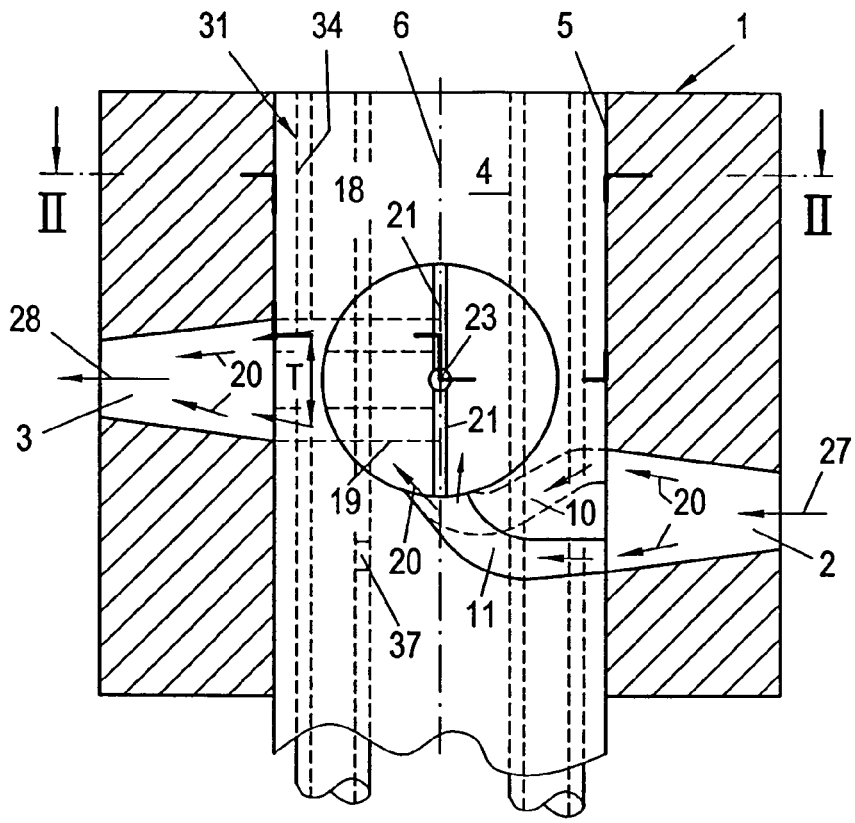

The invention relates to a backwashable filtering device for thermoplastic plastics material, comprising a housing in which at least one feed channel is provided for the material to be filtered and at least one delivery channel is provided for the filtered material, and comprising at least one carrying body which is arranged in the housing, carries at least two nests of screens and is displaceable in the housing between a filtering position and at least one backwashing position associated with a nest of screens, wherein, in the filtering position, distribution chambers arranged on the inflow side of the nests of screens are fluidically connected to at least one feed channel via inflow channels, and collecting chambers arranged on the outflow side of the nests of screens are fluidically connected to at least one delivery channel via outflow channels, and, in the backwashing position of the carrying body, filtered material passes from the collecting chamber of one nest of screens, through a backwashing channel arranged in the carrying body and into the collecting chamber of another nest of screens to be cleaned and, when the outflow channel of this other nest of screens is closed, is dischargeable together with the impurities from this nest of screens into a backwashing outlet channel via the distribution chamber of this nest of screens. This type of construction of a backwashable filtering device is known from EP 540 546 B1 and has proved its worth.

SUMMARY OF THE INVENTION

Nevertheless, it is an object of the present invention to improve this construction still further by shortening the backwashing paths and improving the conditions when switching between filtration and backwashing. The invention achieves this object in that at least one control body, which is displaceable in the housing relative to the carrying body, is associated with each nest of screens for the backwashing of this nest of screens portion by portion, each of these control bodies forming a discharge channel which, in the backwashing position, is fluidically connected to at least one backwashing outlet channel via at least one control opening. By suitably arranging this control body relative to the position of the backwashing outlet channel of the carrying body, the length of the backwashing outlet channel can be greatly shortened in comparison with the initially described, known construction, which is synonymous with a reduction in the risk of cracking of the plastics material in this outlet channel. At the same time, with suitable displacements of the carrying body and the control body, the advantage is achieved that the backwashing process does not begin when the carrying body is moved into the backwashing position, but only when the control opening of the control body, by appropriate displacement thereof, is brought into alignment with the backwashing outlet channel of the carrying body. This leads to a decrease in wear to the carrying body, which is synonymous with an increase in the service life of the carrying body and with it the entire device.

According to a preferred embodiment of the invention, at least two control bodies, which are displaceable independently of one another, are provided for each nest of screens, each control body being associated with a portion of the nest of screens for the backwashing of that portion. Although the nest of screens can also be backwashed portion by portion without this measure, this portion-wise backwashing process can be further improved by the last-mentioned measure and, with appropriate construction, takes place uniformly for all portions of the nest of screens.

According to a further development of the invention, each control body is formed by a slider which is displaceable in its longitudinal direction and/or rotatable about its longitudinal axis, wherein the discharge channel extends in the axial direction of the slider and each control opening pierces the wall of the discharge channel. In this case, at least one slider has at least two control openings which, for a displaceable slider, are spaced apart in the longitudinal direction of the slider and, for a rotatable slider, are spaced apart in the circumferential direction of the slider.

A particularly simple structure is produced when each control body is formed by a tube which is displaceably and/or rotatably guided in a bore of the housing. The input required for manufacturing the control body is thus reduced to the formation of the control openings, which are easily producible by boring, since commercially available components can be used for the tube of the control body.

Particular advantages are produced within the framework of the invention if each backwashing outlet channel is arranged substantially centrally in relation to its associated portion of the nest of screens because, in this way, the amount of cleaned plastics material required for the backwashing process can be reduced and uniform conditions are achievable for all portions of the nest of screens.

Within the framework of the invention, there is the further possibility of reducing the size of the distribution chambers. According to the invention, this can be achieved by at least one nest of screens having two curved perforated plates, between which is arranged a screen which is circular when laid flat, wherein the two perforated plates are inserted into a receiving opening in the carrying body, the receiving opening having an oval cross-section corresponding to the curvature of the perforated plates when seen in the axial direction of the receiving opening, and wherein the perforated plates are arranged so that their convex side lies on the inflow side during the filtering process. This produces the aforementioned reduction in the size of the distribution chambers and, at the same time, an increase in the size of the collecting chambers, the latter circumstance having a favorable effect during the backwashing process since the cleaned melt, which is used during the backwashing process, can distribute itself more evenly over the entire surface of the filter portion to be backwashed. At the same time, the possibility of using commercially available, circular screens is retained and rotation of the perforated plates is prevented.

Within the framework of the invention, the surface of each nest of screens can be divided into any number of portions which are backwashable individually or in groups. Strict division of the screen surface into individual, separately backwashable portions can easily be achieved if, in the case of at least one nest of screens, the collecting chamber is divided into collecting-chamber portions by at least one transverse wall supporting the screen. These transverse walls simultaneously help to support the screen during the backwashing process, which has a highly beneficial effect, in particular in the case of the aforementioned construction with curved perforated plates.

Embodiments of the invention are schematically shown in the drawings.

SUMMARY OF THE INVENTION

Figure 2:
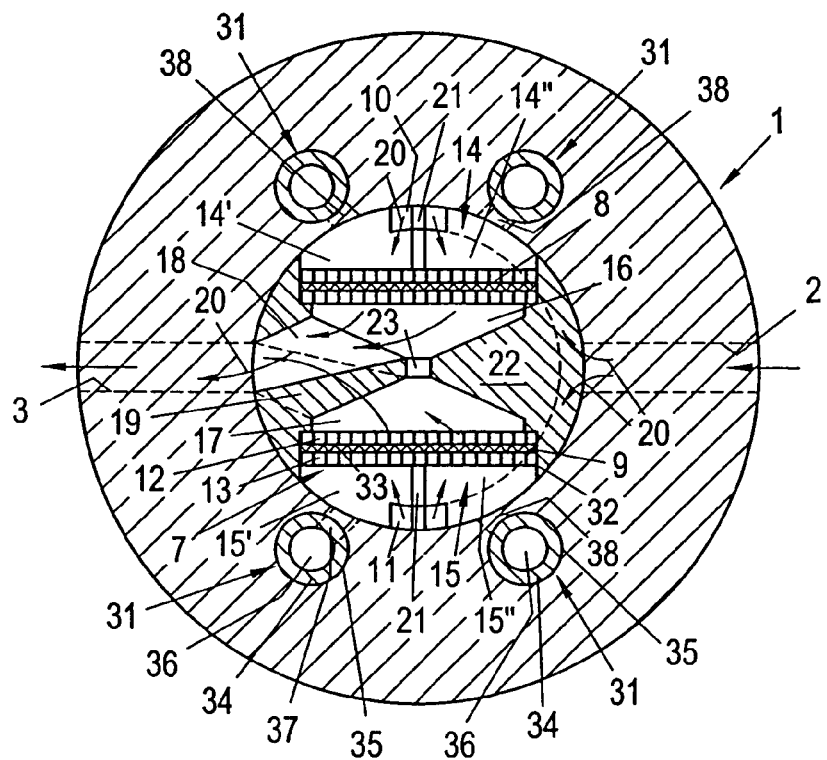
Figure 3:
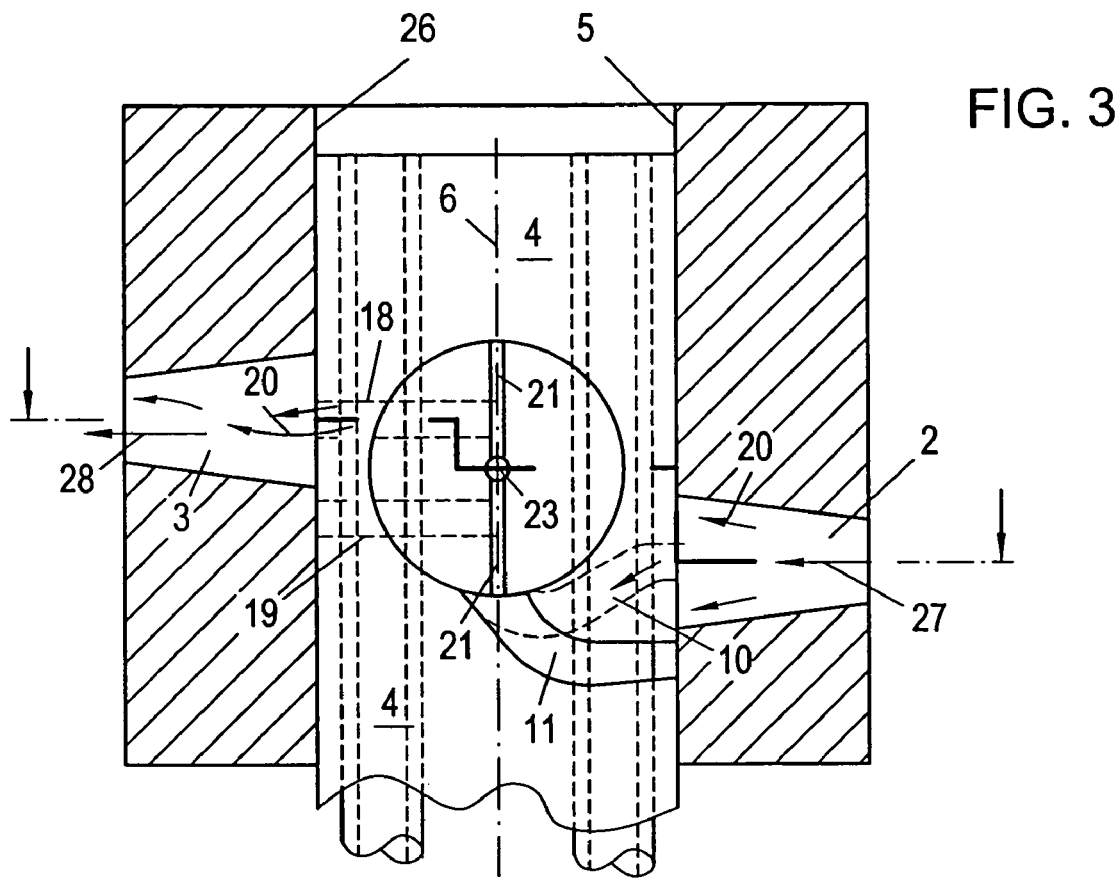
Figure 4:
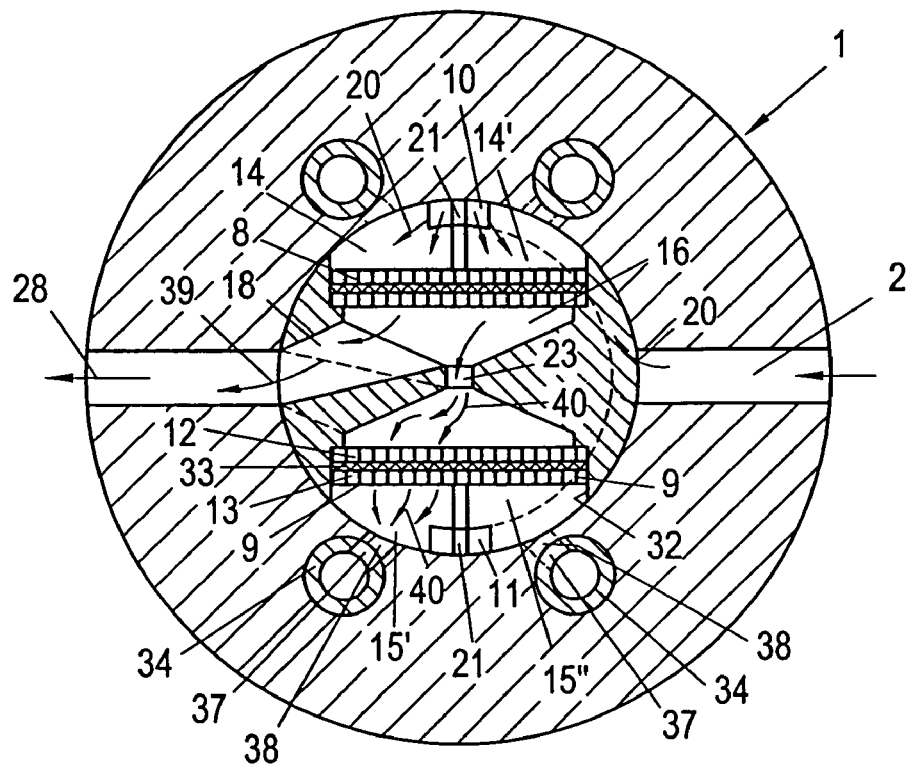
Figure 5:
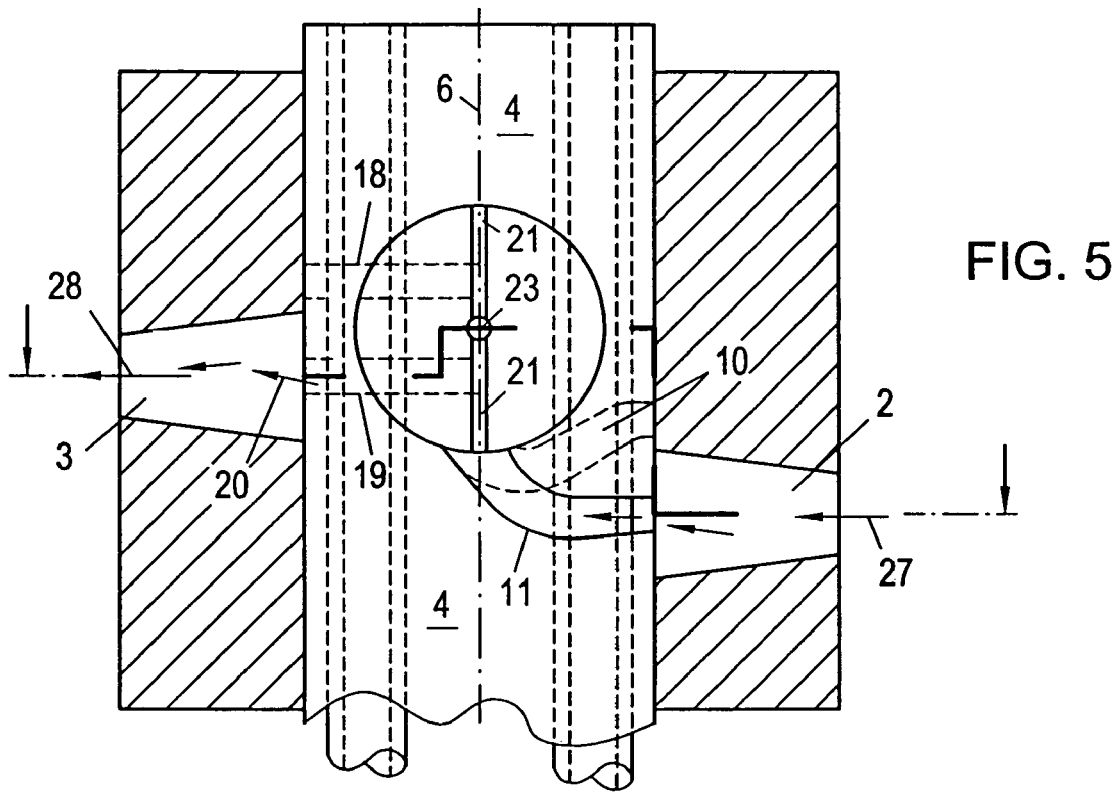
Figure 6:
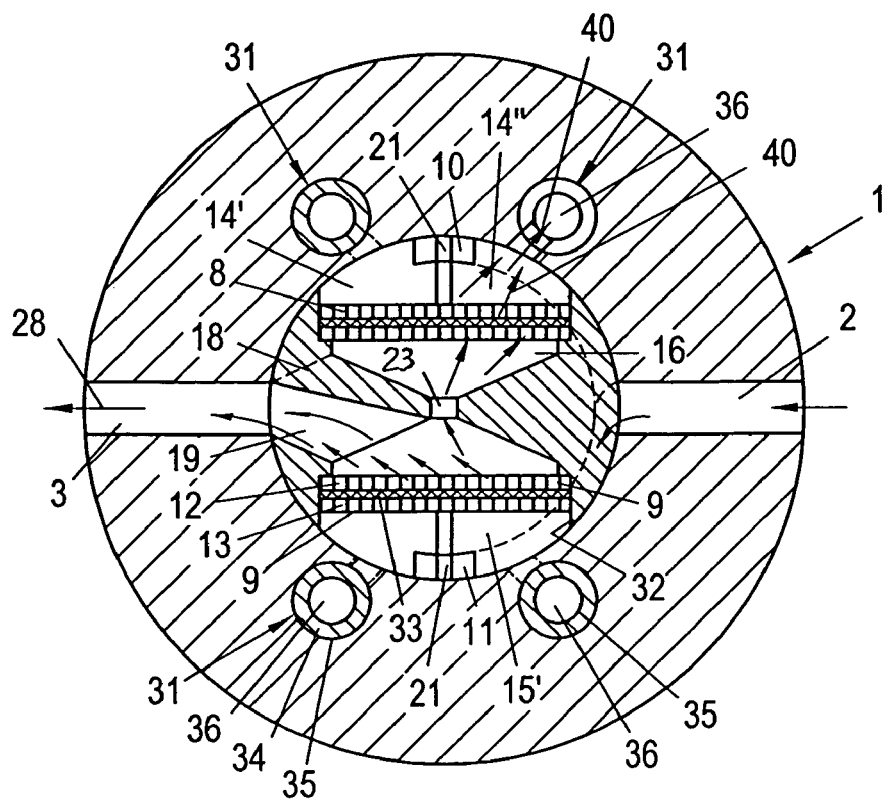
Figure 8:
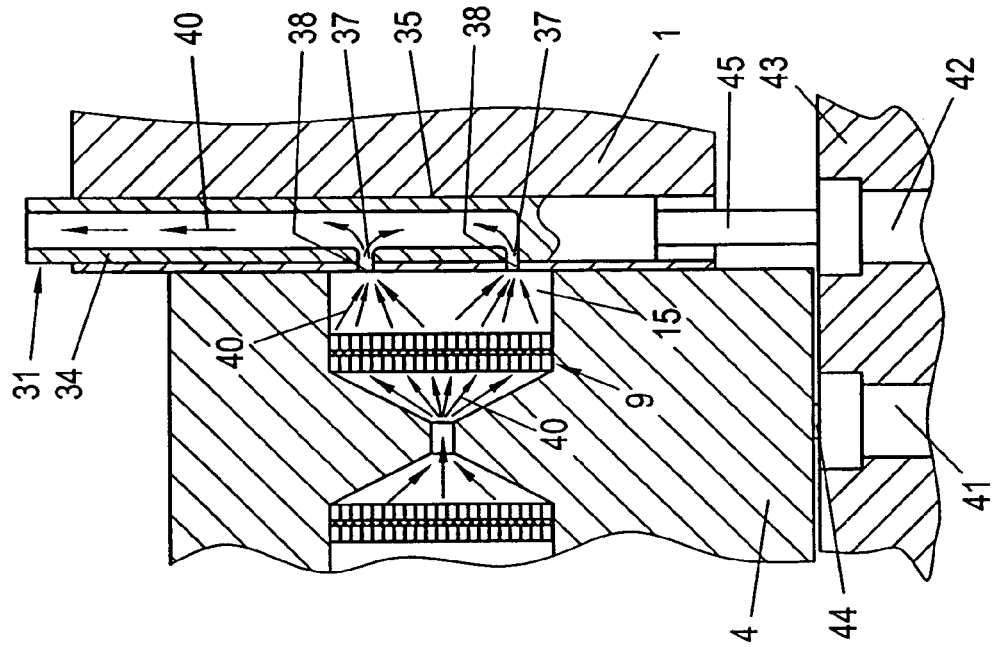
Figure 7:
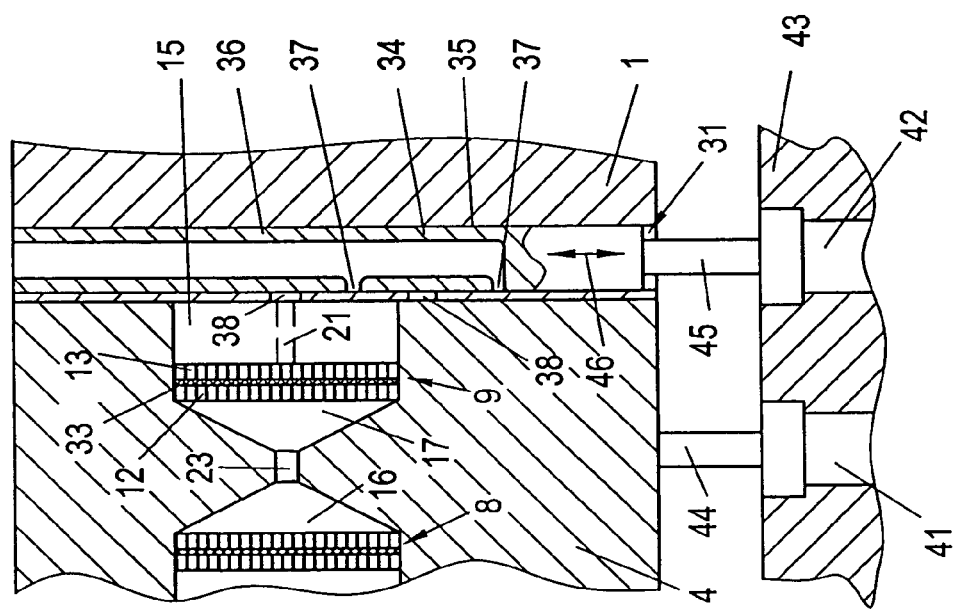
Figure 9:
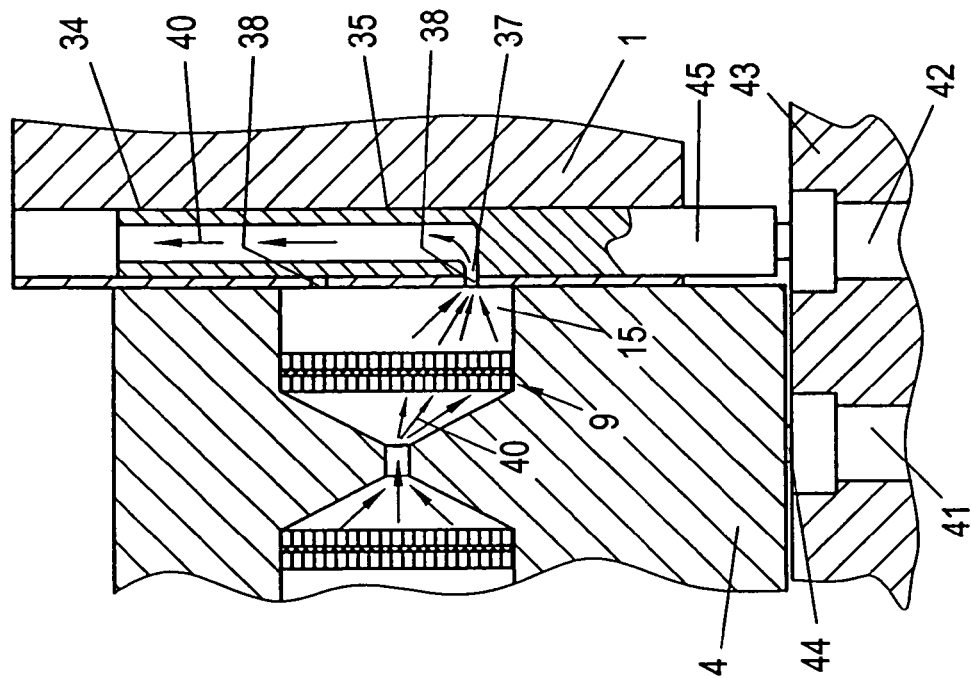
Figure 10:
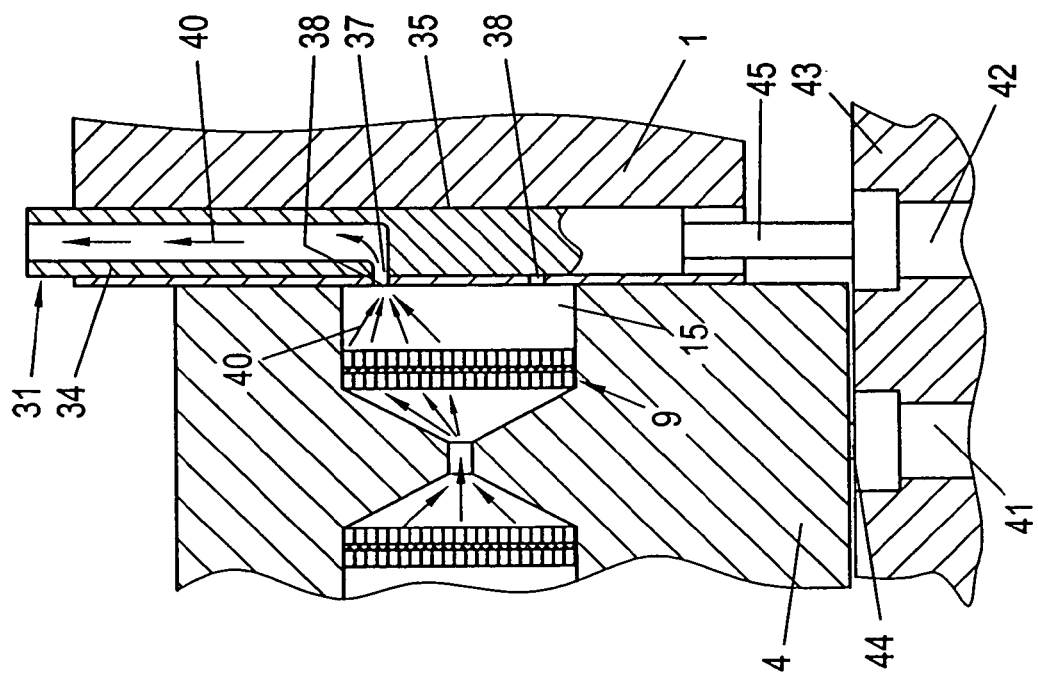
Figure 11:
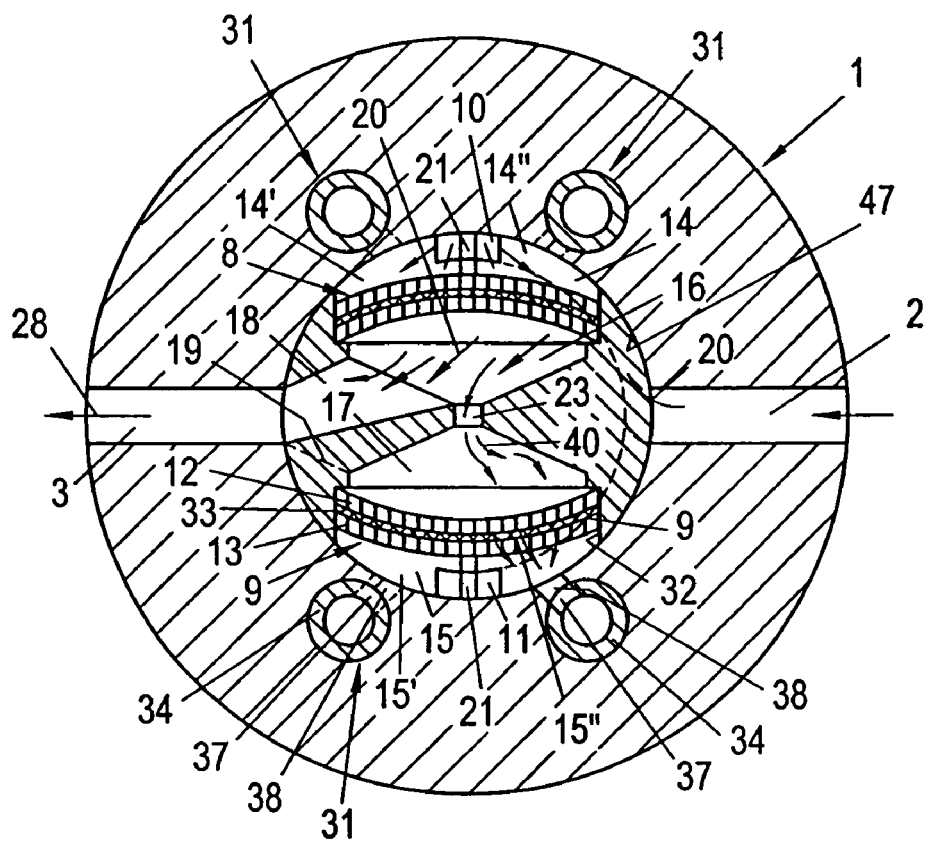
Figure 12:
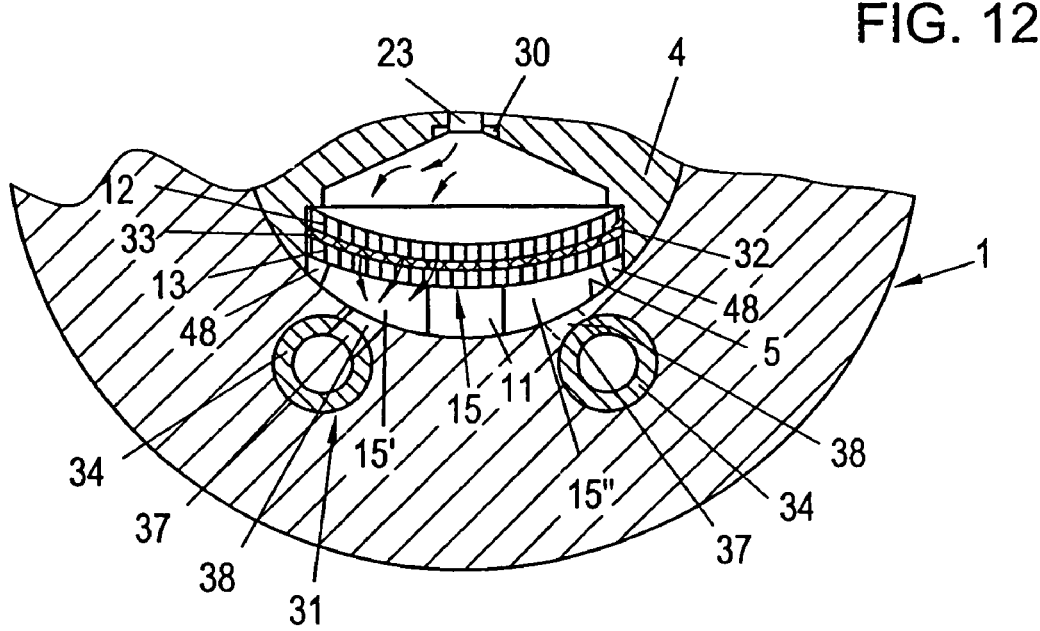

FIG. 1 shows the device in the filtering position in section through the axis of the carrying body, although the latter is shown in side view, FIG. 2 shows the device according to FIG. 1 in section along the line II-II in FIG. 1, FIGS. 3 and 4 are sections similar to FIGS. 1 and 2, but show the device in the backwashing position for the left-hand half of the nest of screens arranged at the bottom in FIG. 4, FIGS. 5 and 6 are sections similar to FIGS. 3 and 4, but show the device in the backwashing position for the right-hand half of the nest of screens arranged at the top in FIG. 6, FIG. 7 shows the device with a control body formed as a longitudinal slider in the filtering position in section through the axis of the control body, FIG. 8 shows the device according to FIG. 7 in a position in which the entire nest of screens is being backwashed, FIG. 9 shows the device according to FIGS. 7 and 8 in a position for backwashing the upper portion of the nest of screens in FIG. 9, FIG. 10 shows the device according to FIGS. 7 to 9 in a position for backwashing the lower portion of the nest of screens in FIG. 10, FIG. 11 shows, in a section similar to FIG. 1, an embodiment in which the nests of screens have curved perforated plates, and FIG. 12 shows a variant of FIG. 11.

DESCRIPTION OF THE PREFERRED EMBODIMENTS

In the embodiment according to FIGS. 1 to 6, the device comprises a housing 1 having a feed channel 2 for the thermoplastic plastics material to be filtered and a delivery channel 3 for the filtered material. On the way from the feed channel 2 to the delivery channel 3, the material flows through a carrying body 4 in the form of a rotational cylinder which is guided in a cylindrical bore 5 of the housing 1 so as to be longitudinally displaceable along its axis 6. A screen arrangement 7 is embedded in the carrying body 4 and has two nests of screens 8, 9, each of which comprises two perforated plates 12, 13, between which lies a filter insert 33 for filtering the plastics material. In the filtering position of the device (FIGS. 1, 2), the material to be filtered is fed to the nests of screens 8, 9 by means of inflow channels 10, 11 which lead into distribution chambers 14, 15 of the carrying body 4, the distribution chambers 14, 15 lying upstream of the nests of screens 8, 9. Downstream of the nests of screens 8, 9, seen in the flow direction of the melt during the filtering process (arrows 20), collecting chambers 16, 17 for the melt lie in the carrying body 4, from which spaces the melt flows through outflow channels 18, 19 into the delivery channel 3, which is common to both outflow channels 18, 19. The inflow channels 10, 11 of the two nests of screens 8, 9 each open on both sides of a central wall 21 which stands perpendicularly against the two perforated plates 12, 13 of the respective nest of screens 8, 9 and extends from these perforated plates as far as the circumference of the carrying body 4. Consequently, this wall 21 supports the associated screen against the wall of the bore 5 during backwashing. The two perforated plates 12, 13, together with the filter insert 33 lying between them, are inserted into a receiving opening 32 in the carrying body 4. The wall thus divides each associated distribution chamber 14, 15 into two compartments of substantially equal volume, thereby defining portions 14', 14" and 15', 15" of the respective nest of screens 8, 9.

The two collecting chambers 16, 17 are separated from one another by a dividing wall 22 extending transversely to the axis of the carrying body 4. This dividing wall is pierced by at least one central bore or opening, which bore connects the two collecting chambers 15, 16 to one another and forms a backwashing channel 23.

The housing 1 also has, for each portion 14', 14", 15', 15" of the nests of screens 8, 9, a control body 31 which, in this embodiment, is formed by a tube forming a slider 34 which is guided so as to be longitudinally displaceable in a bore 35 of the housing 1 in the longitudinal direction of the tube. The hollow space of this tube forms a discharge channel 36 for the impurities released from the backwashed screen during the backwashing process. This discharge channel 36 leads out of the housing 1 and into the open air or into a collecting chamber which collects these impurities. The wall of the tube of the control body 31 is pierced by at least one control opening 37 which, in the backwashing position, is brought into alignment with a backwashing outlet channel 38 of the housing 1, but in the filtering position is covered by means of corresponding displacement of the control body 31 of the housing 1.

The two outflow channels 18, 19 are spaced apart by an amount T (FIG. 1) in the direction of the axis 6. The distance T is measured so that, in the filtering position shown in FIGS. 1 and 2, the mouths of both outflow channels 18, 19 are overlapped by the inlet opening of the delivery channel 3 so that the filtered material can flow unimpeded out of the carrying body 4. This is made easier by the delivery channel 3 having a funnel-shaped widening facing the two channels 18, 19. The same spacing T is found on the inflow side, namely the mouths of the two inflow channels 10, 11 are likewise spaced apart in the direction of the axis 6. In the filtering position (FIGS. 1, 2), the mouths of these inflow channels 10, 11 in the wall of the carrying body 4 are entirely overlapped by the funnel-shaped widening of the mouth of the feed channel 2. Therefore, in the filtering position, the melt to be filtered is fed uniformly to all four portions 14', 14", 15', 15" of the two nests of screens 8, 9. This melt flows through the two filter inserts 33, is thereby cleaned and the cleaned melt flows through the outflow channels 18, 19 into the delivery channel 3.

By means of suitable measures, the carrying body 4 cannot be rotated about its axis 6, but can be displaced along this axis 6 as desired into one of a plurality of backwashing positions. Two of these backwashing positions are shown in FIGS. 3, 4 and 5, 6. In the position shown in FIGS. 3 and 4, the left-hand portion 15' of the nest of screens 9 is being cleaned. In the position shown in FIGS. 5 and 6, the right-hand portion 14" of the nest of screens 8 is being backwashed. In the backwashing position shown in FIGS. 3 and 4, the carrying body 4 has been displaced downwards from the filtering position shown in FIGS. 1 and 2 until on the one hand the outflow channel 19 and on the other hand the inflow channel 11 are closed by the inner wall 26 of the housing 1, along which inner wall the carrying body 4 is longitudinally displaceably guided. The plastics melt to be cleaned, which is fed into the feed channel 2 in the direction of the arrow 27, can therefore only flow from the feed channel 2 into the inflow channel 10, where it flows in the direction of the arrows 20 into the two portions 14', 14" of the distribution chamber 14. The melt therein passes through the filter insert 33 of the nest of screens 8, in so doing is cleaned, and flows in part via the outflow channel 18 into the delivery channel 3 (arrows 39), from which it flows in the direction of the arrow 28 to the point of application, e.g. to a screw extruder with connected mold. The other part of the melt flows out of the collecting chamber 16 in the direction of the arrows 40, through the backwashing channel 23 and into the collecting chamber 17 of the other nest of screens 9. From this collecting chamber 17, the melt can pass through the nest of screens 9 only into the left-hand portion 15' of the distribution chamber 15, since only from there is it possible for the melt to flow any further. For this portion 15', the control opening 37 of the slider 34 forming the control body 31 is fluidically connected to the backwashing outlet channel 38 associated with this screen portion 15'. However, the control slider 34 associated with the portion 15" of the nest of screens 9 is in a position in which its control opening 37 is not fluidically connected to the backwashing outlet channel 38 associated with this portion 15". Therefore, only the left-hand portion of the nest of screens 9 is backwashed by the cleaned melt supplied from the backwashing channel 23. The impurities which are firmly attached to the filter insert 33 in this portion 15' are released by this backwashing melt and carried by the flowing melt out of the respective portion 15' of the distribution chamber 15 in the arrow direction 40 and conveyed via the backwashing outlet channel 38 and the control opening 37 fluidically connected thereto into the discharge channel 36 of the control slider and from there into the open air or into the aforementioned collecting chamber. As is apparent, with this cleaning process restricted to the left-hand half of the nest of screens 9, the melt supply to the system connected to the delivery channel 3 is maintained and there is only a slight drop in pressure in the delivery channel 3 relative to the normal filtering position (FIGS. 1, 2). As only one-half of the nest of screens 9 is backwashed, the pure melt flow supplied via the backwashing channel 23 is concentrated on this left-hand screen half, with the result that there is an increased rate of flow of the melt through this screen half and with it an improved cleaning effect. After the backwashing time has elapsed, the slider 34 is displaced again so that its control opening 37 is closed, whereupon the backwashing process for this screen portion 15' is terminated. If no other screen portion is to be backwashed, the carrying body 4 is moved back into the filtering position (FIG. 1), whereupon filtering of the melt supplied via the feed channel 2 is once more fully implemented.

Conditions are analogous if the right-hand half of the nest of screens 9 is to be backwashed. The carrying body 4 is displaced into the backwashing position in which, as described in connection with FIGS. 3 and 4, the outflow channel 19 is closed off from the delivery channel 3, and the inflow channel 11 is closed off from the feed channel 2. The control slider 34 of the right-hand screen portion 15" is then moved into the backwashing position, whereby its control opening 37 is fluidically connected to the associated backwashing outlet channel 38. The backwashing material can therefore flow out of that part of the collecting chamber 15 which is associated with the portion 15" of the nest of screens 9. The backwashing process is terminated as soon as the control slider 34 is displaced so that its control opening 37 is closed.

The conditions for backwashing the nest of screens 8 arranged at the top in the drawings are analogous to the above-described backwashing positions according to FIGS. 3 and 4. The melt flow for backwashing the right-hand portion 14" of the chamber 14 is indicated by the arrows 40 in FIG. 6.

As is apparent, the carrying body 4 has to be displaceable into different positions, but does not necessarily have to be displaceable in the longitudinal direction. Instead, it is also entirely possible to achieve the described opening and closing of the individual channels by rotating the carrying body 4 about its axis 6. The same applies to the control bodies 31. Instead of longitudinally displaceable sliders, they can also be formed by rotary sliders. A combination of the two variants (displacement and rotation) for the control sliders 31 is even conceivable, in particular when each nest of screens is divided into more than two portions.

As is apparent, the nests of screens 8, 9 are inserted into their receiving openings 32 in the carrying body 4 so that the screen surfaces are parallel to one another. This forms a clear arrangement which is easy to manufacture and facilitates assembly and disassembly. However, in order to obtain particular flow conditions, it would also be possible to embed the two nests of screens 8, 9 in the carrying body 4 in a substantially V-shaped arrangement, just as more than two nests of screens may also be provided. Furthermore, as already mentioned, each nest of screens can also be divided into more than two portions for backwashing, for which purpose only the arrangement of the backwashing outlet channels 38, like that of the backwashing outlet sliders 34, has to be selected accordingly. The use of equal-sized portions, into which the distribution chambers 14, 15 of the nests of screens are divided, is recommended for reasons of uniformity, in particular with respect to the throughput delivered via the delivery channel, but is not absolutely necessary.

The ratio of the melt flow, which flows from the respective collecting chamber into the respective active discharge channel 36 of the control slider 34 during backwashing, to the entire flow of plastics material flowing through the device during the filtering process is substantially determined by the channel cross-sections. This ratio can be influenced by the insertion of different flow restrictors into the channels which are active during the backwashing process, in particular the backwashing channel 23. An exchangeable throttle element 30, formed as a throttle nozzle and influencing the flow resistance, is schematically indicated in FIG. 12. Optionally, this type of throttle element can be adjustable with respect to its flow cross-section so as to be adaptable to different operating conditions.

The filtering position is also shown in FIG. 7, in a different view. It can be seen that the carrying body 4 and the control body 31 are each in a position such that two backwashing outlet channels 38 of the housing 1, which are associated with the nest of screens 9, are closed by the wall of the slider 34, i.e. so that the control openings 37 piercing this wall are not in alignment with the backwashing outlet channels 38. As is apparent, this is irrespective of whether or not a wall 21 is arranged in the distribution chamber 15. The corresponding displacement of the carrying body and the control body 31 is carried out by means of double-acting hydraulic or pneumatic cylinders 41, 42 which are fixed to a frame 43 of the device and the piston rods 44 and 45 of which are connected to the carrying body 4 and the control body 31 respectively, these components thus being displaceable in the direction of the double arrow 46.

In the backwashing position shown in FIG. 8, the arrangement is such that the entire surface of the nest of screens 9 is backwashed. For this purpose, the carrying body 4 and the control body 31 are displaced by the cylinders 41 and 42 so that the control openings 37 of the control body 31 are fluidically connected to the backwashing outlet channels 38, the latter lying so that they are arranged as centrally as possible in relation to the area of the screen to be backwashed. The flow of the melt used during the backwashing process is indicated by the arrows 40.

For backwashing a portion of the nest of screens 9, there are two possibilities: either the carrying body 4 is displaced so that the backwashing outlet channel 38 to be rendered inactive is covered by the housing 1, while the other backwashing outlet channel 38 is fluidically connected to one of the two control openings 37, or, as a second possibility, the control slider 34 is displaced so that only one of the two control openings 37 is fluidically connected to the respective backwashing outlet channel 38 to be rendered active.

Whereas FIGS. 7 and 8 show embodiments in which the control slider 34 has two control openings 37 which are axially spaced from one another, FIGS. 9 and 10 show an embodiment in which the control slider 34 has only one control opening 37. This control opening 37 can be fluidically connected to one of the two backwashing outlet channels 38. In FIG. 9, this is shown for backwashing the upper portion of the nest of screens 9, and in FIG. 10 for backwashing the lower portion of the nest of screens 9.

Although there is no wall 21 shown here which divides into two portions the distribution chamber 15 of the nest of screens 9 to be backwashed, the nest of screens 9 is nevertheless substantially backwashed in portions. This is because, with a suitable arrangement of the backwashing outlet channel 38 in relation to the screen portion to be backwashed, flow conditions which favor backwashing of the screen portion adjacent to the backwashing outlet channel 38 are produced in the distribution chamber 15, as indicated by the arrows 40 in FIGS. 9 and 10, i.e. for the upper portion of the nest of screens 9 in FIG. 9 and for the lower portion of the same in FIG. 10.

FIG. 11 shows an embodiment in which the nests of screens have a curved or bowed form. For this purpose, the two perforated plates 12, 13 of the nest of screens are curved and, when inserted into the receiving opening 32, lie with their convex side facing outwards, i.e. on the inflow side in the filtering state. The filter insert 33 lies between the two perforated plates 12, 13 and has a circular circumference when laid flat, with the result that commercially available filter inserts can be used. In order to make this possible, the receiving opening 32 and the two perforated plates 12, 13 have an oval circumferential shape corresponding to the selected curvature of the perforated plates 12, 13. The perforated plates 12, 13 can be supported by walls 21 against the wall 47 of the bore 5, in which the carrying body 4 is displaceably guided. As a result, on the one hand the perforated plates 12, 13 are supported during the backwashing process, and on the other hand the respective distribution chamber 14, 15 is divided into the two portions 14', 14" and 15', 15", as already mentioned. The curved formation of the perforated plates 12, 13 enlarges the collecting chamber 16, 17 supplying the backwashing melt during the backwashing process and correspondingly reduces the size of the distribution chamber 14, 15 lying downstream of the perforated plates 12, 13 (seen in the flow direction of the melt) during the backwashing process. On the one hand this promotes the intensity of the backwashing process, and on the other hand reduces the melt volume in the respective distribution chamber 14, 15 at the start of the backwashing process. In addition, the oval circumferential shape of the perforated plates secures them against rotation.

FIG. 11 shows the backwashing process for that part of the nest of screens 9 which is associated with the right-hand portion 15" of the distribution chamber 15, wherein only the control opening 37 of the control body 31 lying bottom right is fluidically connected to the backwashing outlet channel 38 associated with the control opening 37. The control openings of the other control bodies 31 are arranged so that there is no fluidic connection to the respective backwashing outlet channel.

The embodiment according to FIG. 12 differs from that according to FIG. 11 only in that the wall 21 has been omitted. In order to create a sufficiently large distribution chamber 15 in this case, but still securely hold the perforated plates 12, 13 and the filter 33 lying therebetween, the edge of the perforated plate 13 adjacent to the wall of the bore 5 has projections 48 or correspondingly formed surfaces which are supported against this wall. This additional support can also be beneficial when the wall 21 is used.

In addition to the difference in relation to FIG. 11, FIG. 12 shows the backwashing process for the left-hand portion 15' of the distribution chamber 15. The flow conditions here are similar to those described in connection with FIGS. 9 and 10.

In all embodiments, the backwashing outlet channels 38 are arranged as centrally as possible in relation to the respective associated portion of the nest of screens. In this way, equally long drainage paths are provided for the dirt particles, together with uniform backwashing of the respective portion of the nest of screens. Furthermore, the amount of backwashing material required is reduced.

It is advantageous if the dividing wall 22, which lies between the two collecting chambers 16, 17, is formed as thinly as possible, in particular in the central portion of the dividing wall 22. This produces a corresponding enlargement of the cross-sections of the outflow channels 18, 19 and, as a result, particularly favorable flow conditions for the plastics melt. Furthermore, the length of the backwashing channel 23 is thereby restricted to a minimum. This backwashing channel 23 therefore only needs to be as long as is necessary to hold the throttle element 30 securely. The short length of the backwashing channel 23 also makes it easier to install the throttle element 30 and gain access to it for cleaning and replacement purposes. Moreover, the short length of the backwashing channel 23 has a favorable effect on the prevention of cracking of the plastics material in the backwashing channel 23, particularly as melt only flows through this channel during backwashing.

The control body 31 does not have to be a slider which is displaceable in its longitudinal direction; it can also be formed as a rotary slider. In this case, a plurality of control openings 37 are distributed over the circumference of the tube of the rotary slider. The principles of a longitudinally displaceable slider and a rotary slider can also be combined; i.e. the tubular slider is both displaceable in its longitudinal direction and rotatable about its axis. This embodiment is suitable in particular when the surface of the nests of screens 8, 9 is divided not only in the axial direction of the carrying body 4, as shown in FIGS. 1 to 12, but also transversely thereto, e.g. by (additional) walls 21 lying parallel to the plane of the drawing. However, it must always be ensured that the walls 21 do not significantly impede the inflow, from the inflow channels 10, 11, of the melt to be filtered.

Furthermore, the configuration according to the invention is also applicable to devices having two or more supporting bodies 4. In a device with two supporting bodies each having two nests of screens, and in a construction in which each nest of screens is divided into two portions for backwashing, only an eighth of the screen area remains in the backwashing flow during the backwashing process; i.e. the amount of material used during the backwashing process is concentrated on a small screen area which is backwashed with a higher rate of flow so that good cleaning is achieved. The configuration according to the invention is also applicable to devices in which a single carrying body 4 carries two or more screen-nest pairs, i.e. four or more nests of screens.

For the sake of simplicity, the embodiments shown in the drawings are each shown with a single feed channel 2 and a single delivery channel 3. In practice, it is usually preferable to provide more than one feed channel 2 and delivery channel 3, in which case it is simply necessary to preserve the aforementioned connection relationships.

In the construction according to the invention, the release of dirt particles from the nests of screens can easily be improved by the discharge channels 36 being alternately opened and closed by a periodic reciprocating movement of the control openings 37 in the respective control body 31, thereby producing an intermittent backwashing process.

The invention claimed is:

1. A backwashable filtering device for thermoplastic plastics material, comprising:
    a housing having at least one feed channel configured as an inlet of the material to be filtered and at least one delivery channel configured as an outlet for the filtered material,
    at least one carrying body configured to be movable between a filtering and a backwashing position inside the housing,
    at least two nests of screens disposed inside carrying body, said nests of screens being configured for the filtering position and the backwashing position,
    a distribution chamber arranged on the inflow side of each nest of screens, said distribution chamber being fluidically connected to the at least one feed channel via inflow channels,
    a collecting chamber arranged on the outflow side of each nest of screens, said collecting chamber being fluidically connected to the at least one delivery channel via outflow channels,
    wherein in the backwashing position a portion of the filtered material flows:
        from the collecting chamber of one nest of screens,
        through a backwashing channel arranged in the carrying body,
        into the collecting chamber of another nest of screens,
        through the backwashed nest of screens, thus removing impurities from the backwashed nest of screens,
        into the distribution chamber of the backwashed nest of screens,
        into a backwashing outlet channel fluidically connecting the distribution chamber to at least one control body,
        into at least one control opening of the at least one control body,
        into a discharge channel of the at least one control body, and further out of the device,
    wherein the at least one control body:
        is movable relative to the carrying body and relative to other control bodies in the longitudinal or the rotational direction,
        is configurable for backwashing either an entire nest of screens or a selectable portion of the nest of screens, and
        is in the flow path only in the backwashing position, and out of the flow path in the filtering position.

2. A device according to claim 1, wherein at least two control bodies, which are displaceable independently of one another, are provided for each nest of screens, each control body being associated with a portion of the nest of screens for the backwashing of that portion.

3. A device according to claim 1, wherein each control body is formed by a slider which is displaceable in its longitudinal direction and/or rotatable about its longitudinal axis, wherein a discharge channel extends in the axial direction of the slider and each control opening pierces the wall of the discharge channel.

4. A device according to claim 3, wherein at least one slider has at least two control openings which, for a displaceable slider, are spaced apart in the longitudinal direction of the slider and, for a rotatable slider, are spaced apart in the circumferential direction of the slider.

5. A device according to claim 3, wherein each control body is formed by a tube which is displaceably and/or rotatably guided in a bore of the housing.

6. A device according to claim 1, wherein each backwashing outlet channel is arranged substantially centrally in relation to its associated portion of the nest of screens.

7. A device according to claim 1, wherein at least one nest of screens has two curved perforated plates, between which is arranged a filter insert which is circular when laid flat, wherein the two perforated plates are inserted into a receiving opening in the carrying body, the receiving opening having an oval cross-section corresponding to the curvature of the perforated plates when seen in the axial direction of the receiving opening, and wherein the perforated plates are arranged so that their convex side lies on the inflow side during the filtering process.

8. A device according to claim 1, wherein, in the case of at least one nest of screens, the collecting chamber is divided into collecting-chamber portions by at least one wall supporting a perforated plates.

* * * * *